United States Patent
Mitsutani

(10) Patent No.: US 9,873,339 B2
(45) Date of Patent: Jan. 23, 2018

(54) VEHICLE, POWER SOURCE SYSTEM, AND CONTROL METHOD OF POWER SOURCE SYSTEM

(71) Applicant: Noritake Mitsutani, Toyota (JP)

(72) Inventor: Noritake Mitsutani, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 542 days.

(21) Appl. No.: 14/416,447

(22) PCT Filed: Sep. 10, 2013

(86) PCT No.: PCT/IB2013/001957
§ 371 (c)(1),
(2) Date: Jan. 22, 2015

(87) PCT Pub. No.: WO2014/057321
PCT Pub. Date: Apr. 17, 2014

(65) Prior Publication Data
US 2015/0183325 A1    Jul. 2, 2015

(30) Foreign Application Priority Data

Oct. 10, 2012 (JP) .................................. 2012-225092

(51) Int. Cl.
*B60L 11/08*    (2006.01)
*B60L 11/18*    (2006.01)
(Continued)

(52) U.S. Cl.
CPC ......... *B60L 11/1803* (2013.01); *B60L 3/0023* (2013.01); *B60L 11/005* (2013.01);
(Continued)

(58) Field of Classification Search
USPC ........................................................ 307/10.1
See application file for complete search history.

(56) References Cited

U.S. PATENT DOCUMENTS

2009/0160249 A1* 6/2009 Soma .................... B60L 11/005
                                                         307/9.1
2010/0222952 A1   9/2010 Yamaguchi
(Continued)

FOREIGN PATENT DOCUMENTS

| CN | 102196941 A | 9/2011 |
|----|-------------|--------|
| JP | 2007-236132 A | 9/2007 |

(Continued)

*Primary Examiner* — Rexford Barnie
*Assistant Examiner* — Xuan Ly
(74) *Attorney, Agent, or Firm* — Andrews Kurth Kenyon LLP

(57) ABSTRACT

A second power storage device is electrically connected to a positive electrode line and a negative electrode line, and electric power for generating a driving force is directly supplied to an inverter section. A converter section supplies electric power received from the inverter section to a first power storage device. Because a backflow prevention circuit is provided, the electric power is not supplied in the direction of the second power storage device at this point. A diode of the backflow prevention circuit is connected between a system main relay and the connection node of a positive electrode line on the positive electrode line branching off from the positive electrode line and connected to the second power storage device. The diode controls the flow of a current from the positive electrode line side toward the second power storage device.

8 Claims, 9 Drawing Sheets

(51) Int. Cl.
*B60L 3/00* (2006.01)
*B60L 11/00* (2006.01)
*B60L 11/12* (2006.01)
*B60L 11/14* (2006.01)
*B60L 15/00* (2006.01)
*B60L 15/20* (2006.01)
*H02J 7/00* (2006.01)
*H02J 7/02* (2016.01)

(52) U.S. Cl.
CPC ............ *B60L 11/08* (2013.01); *B60L 11/123* (2013.01); *B60L 11/14* (2013.01); *B60L 11/1816* (2013.01); *B60L 11/1861* (2013.01); *B60L 11/1864* (2013.01); *B60L 11/1868* (2013.01); *B60L 15/007* (2013.01); *B60L 15/20* (2013.01); *B60L 2210/10* (2013.01); *B60L 2210/30* (2013.01); *B60L 2210/40* (2013.01); *B60L 2240/421* (2013.01); *B60L 2240/527* (2013.01); *B60L 2240/545* (2013.01); *B60L 2240/547* (2013.01); *B60L 2240/549* (2013.01); *B60L 2240/80* (2013.01); *B60L 2250/16* (2013.01); *B60L 2260/22* (2013.01); *B60L 2260/26* (2013.01); *B60L 2270/145* (2013.01); *B60L 2270/20* (2013.01); *H02J 7/0032* (2013.01); *H02J 7/022* (2013.01); *Y02T 10/6217* (2013.01); *Y02T 10/645* (2013.01); *Y02T 10/7005* (2013.01); *Y02T 10/7022* (2013.01); *Y02T 10/7044* (2013.01); *Y02T 10/7061* (2013.01); *Y02T 10/7066* (2013.01); *Y02T 10/7072* (2013.01); *Y02T 10/7077* (2013.01); *Y02T 10/7216* (2013.01); *Y02T 10/7241* (2013.01); *Y02T 10/7275* (2013.01); *Y02T 90/127* (2013.01); *Y02T 90/14* (2013.01)

(56) References Cited

U.S. PATENT DOCUMENTS

| | | |
|---|---|---|
| 2011/0251745 A1 | 10/2011 | Yamamoto et al. |
| 2013/0030633 A1 | 1/2013 | Yamamoto et al. |
| 2013/0264975 A1 | 10/2013 | Kaita et al. |

FOREIGN PATENT DOCUMENTS

| | | |
|---|---|---|
| JP | 2007-244124 A | 9/2007 |
| JP | 2009-142102 A | 6/2009 |
| JP | 2011-199934 A | 10/2011 |
| JP | 2012-234697 A | 11/2012 |
| WO | 2010/050045 A1 | 5/2010 |
| WO | 2011/125187 A1 | 10/2011 |
| WO | 2012/085992 A1 | 6/2012 |

* cited by examiner

FIG. 2 [COMPARATIVE EXAMPLE]

[ FLOWCHART OF EXECUTION OF START PREVENTION PROCESS ]

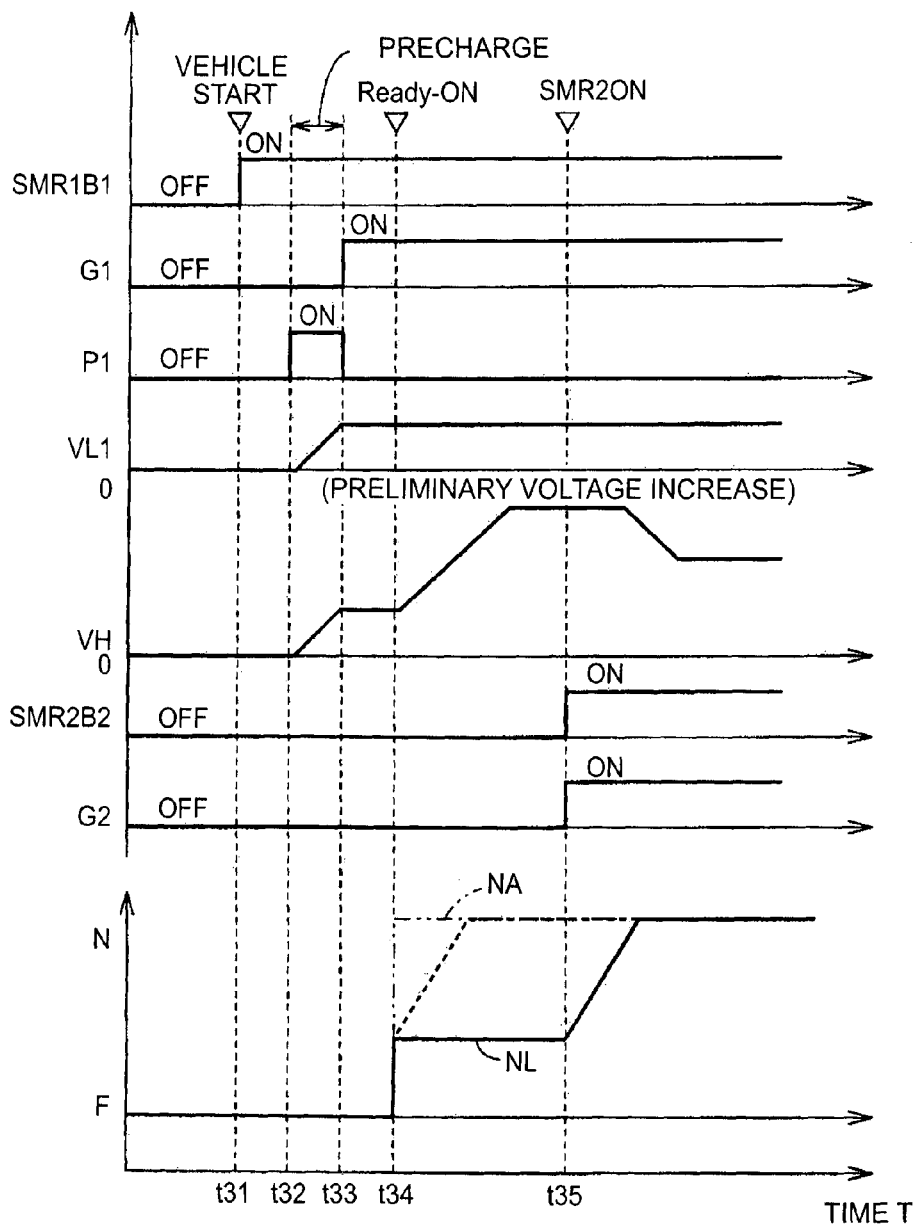

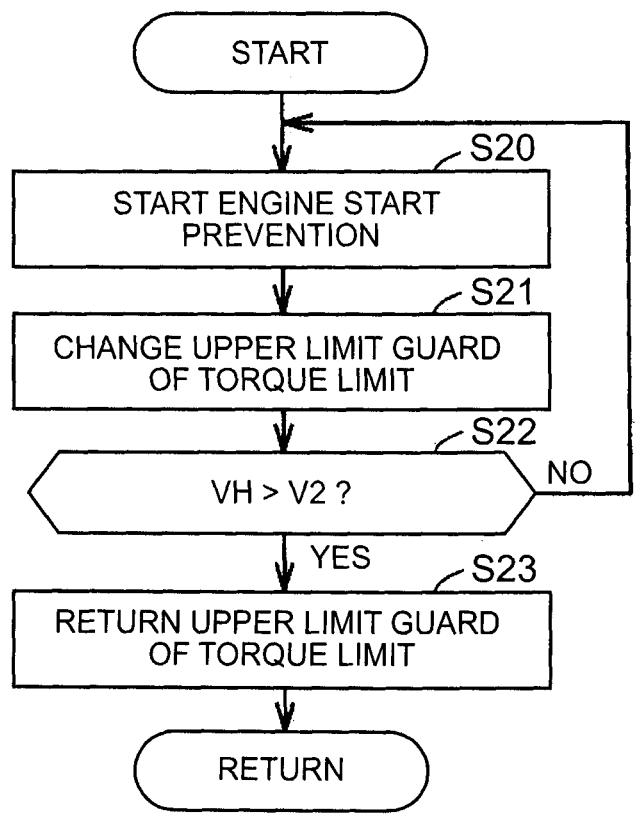

VEHICLE, POWER SOURCE SYSTEM, AND CONTROL METHOD OF POWER SOURCE SYSTEM

CROSS-REFERENCE TO RELATED APPLICATIONS

This is a national phase application based on the PCT International Patent Application No. PCT/IB2013/001957 filed Sep. 10, 2013, claiming priority to Japanese Patent Application No. 2012-225092 filed Oct. 10, 2012, the entire contents of both of which are incorporated herein by reference.

BACKGROUND OF THE INVENTION

1. Field of the Invention

The invention relates to a vehicle, a power source system, and a control method of a power source system, and particularly relates to a start control of a power source system in an electric vehicle.

2. Description of Related Art

There is a Conventional power source system in which a main battery (hereinafter referred to, as a first power storage device) and a sub battery (hereinafter referred to as a second power storage device) are mounted on a vehicle, a step-up converter and a relay switch are disposed in paths between the first and second power storage devices and a load such as a motor or the like, and a plurality of the power storage devices are connected in parallel. Such a power source system is described in, e.g., each of Japanese Patent Application Publication No. 2009-142102 (JP-2009-142102 A) and Japanese Patent Application Publication No. 2011-199934 (JP-2011-199934 A).

In the power source system described above, in a case where the power storage devices have different output voltages, a relay switch including a limiting resistor (hereinafter referred to as a relay switch with a precharge function) is provided, and the power storage device can be connected to the load such that an inrush current does not flow into the load when the power storage device is connected to the load.

However, in the thus configured conventional power source system, it is desirable to simplify the configuration and further improve the efficiency of the power source system, and it is necessary to properly protect equipment at the time of connection of each power storage device.

SUMMARY OF THE INVENTION

In view of the above issue, the invention provides a vehicle, a power source system, and a control method of a power source system capable of properly connecting or disconnecting a plurality of power storage devices to or from each other using no-load energization or the like.

According to one aspect of the invention, there is provided a vehicle including a power source system, a drive device, and a control device. The drive device is configured to be driven with electric power supplied from the power source system. The control device is configured to control the power source system or the drive device. The power source system includes a first power storage device, a voltage conversion device, a second power storage device, a first switch, and a second switch. The voltage conversion device is configured to convert a voltage from the first power storage device. The second power storage device is configured to be electrically connected to a path supplying electric power subjected to the conversion in the voltage conversion device to the drive device and supply electric power to the drive device. The first switch is configured to switch between supply and shutoff of electric power between the first power storage device and the voltage conversion device. The second switch is configured to switch between supply and shutoff of electric power from the second power storage device to the drive device. The control device of the vehicle is configured to control the power source system or the drive device, close the first switch with activation of the power source system, and close the second switch in response to a voltage applied to the drive device being increased to a predetermined voltage.

The control device may further include a notification device configured to provide a notification that the vehicle can travel in response to the first switch being closed.

The first power storage device may further include a high-output battery, and the second power storage device may include a high-capacity battery.

The vehicle may further include a backflow prevention circuit configured to be connected between the drive device and the second switch. The backflow prevention circuit may be configured to prevent a current on a side of the drive device from flowing toward the second power storage device. The backflow prevention circuit may be configured to include a diode.

The drive device may further include a rotary electric machine as a load coupled to an engine, and the control device may be configured to prevent start of the engine until the second switch is closed.

The control device may further be configured to prevent the start of the engine by temporarily relaxing an output limit of the first power storage device.

The control device may further be configured to prevent the start of the engine by temporarily reducing an output torque upper limit value of the rotary electric machine.

According to another aspect of the invention, there is provided a power source system for supplying electric power to a load. The power source system includes a first power storage device, a voltage conversion device, a second power storage device, a first switch, a second switch, and a control device. The voltage conversion device is configured to convert a voltage from the first power storage device. The second power storage device is configured to be electrically connected to a path linking the voltage conversion device and the load and supply electric power to the load. The first switch is configured to switch between supply and shutoff of electric power between the first power storage device and the voltage conversion device. The second switch is configured to switch between supply and shutoff of electric power from the second power storage device to the load. The control device is configured to close the first switch with activation of the power source system, and close the second switch in response to a voltage applied to the load being increased to a predetermined voltage.

According to still another aspect of the invention, there is provided a control method of a power source system for supplying electric power to a load. In the control method, the power source system includes a first power storage device, a voltage conversion device, a second power storage device, a first switch, and a second switch. The voltage conversion device is configured to convert a voltage from the first power storage device. The second power storage device is configured to be electrically connected to a path linking the voltage conversion device and the load and be capable of supplying electric power to the load. The first switch is configured to switch between supply and shutoff of electric power between the first power storage device and the voltage conversion device. The second switch is configured to switch between supply and shutoff of electric power from the second power storage device to the load. The control method closes the first switch to start supply of electric power with activation of the power source system, increases a voltage given from the first power storage device by using the voltage conversion device, and closes the second switch in response to a voltage applied to the load being increased to a predetermined voltage.

According to the invention, by the control device of the vehicle, the first switch is closed when the power source system is activated, and the second switch is closed in response to the voltage applied to the drive device being increased to the predetermined voltage. As a result, it is possible to properly connect and disconnect a plurality of the power storage devices to or from each other using no-load energization or the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a time chart in a case where a start prevention process of a modification of the embodiment is executed; and FIG. 9 is a flowchart specifically showing the start prevention process of FIG. 8.

DETAILED DESCRIPTION OF EMBODIMENTS

Figure 1:
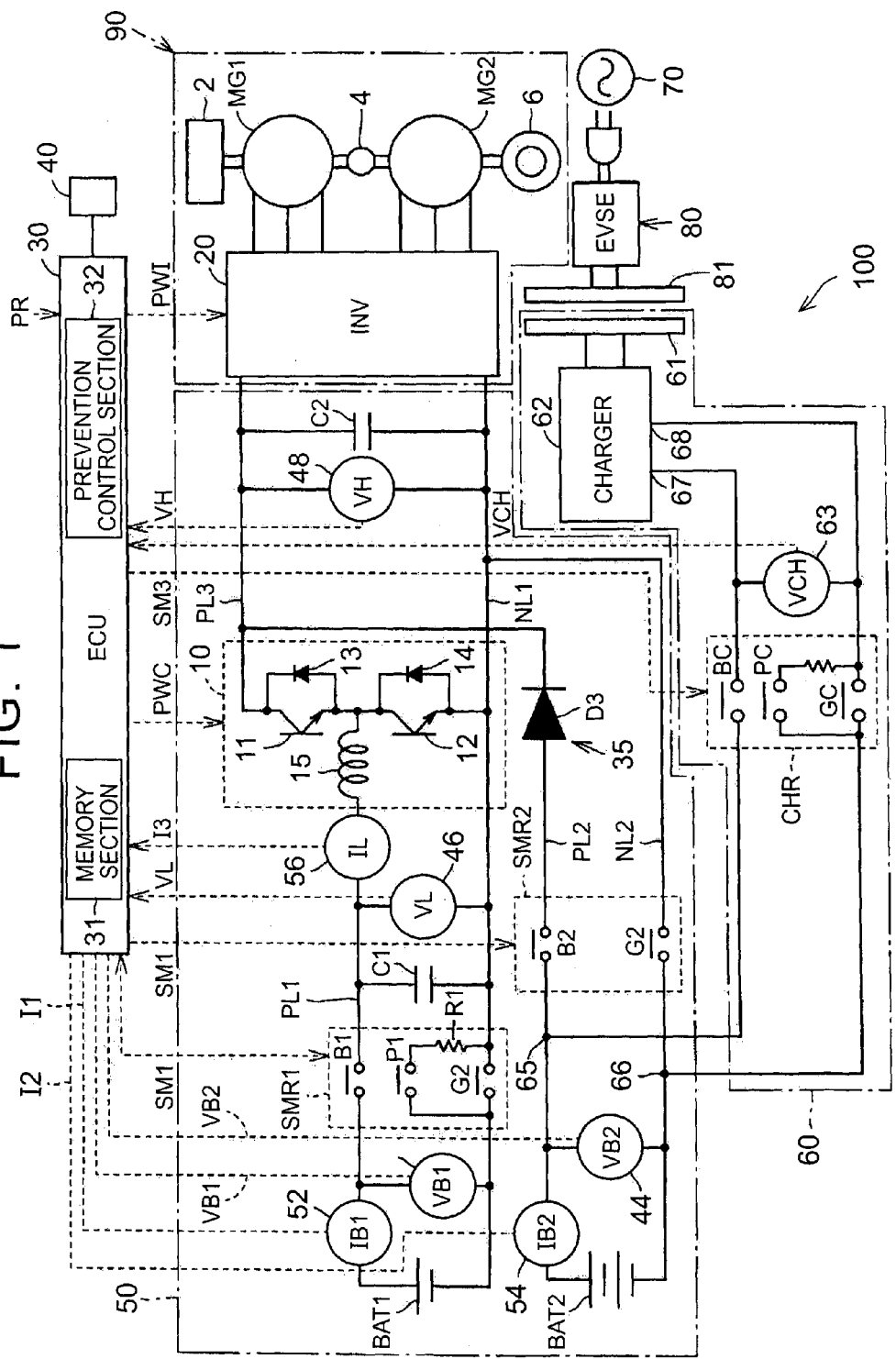
FIG. 1 is an entire block diagram of a hybrid vehicle on which a power source system according to an embodiment of the invention is mounted.

Hereinbelow, an embodiment of the invention will be described with reference to the drawings. In the following description, the same components are designated by the same reference numerals. The names and the functions thereof are identical with each other. Consequently, the detailed description thereof will not be repeated.

First, the configuration of a vehicle will be described. FIG. 1 is an entire block diagram of a hybrid vehicle on which a power source system 50 according to the embodiment of the invention is mounted.

Referring to FIG. 1, a hybrid vehicle 100 has the power source system 50, a drive device 90, and an electronic control unit (ECU) 30 as a control device for controlling the power source system 50 and the drive device 90.

The power source system 50 has a first power storage device BAT1, a second power storage device BAT2, system main relays SMR1 and SMR2, a converter section 10, capacitors C1 and C2, a backflow prevention circuit 35, voltage sensors 42, 44, 46, and 48, and current sensors 52, 54, and 56.

Among them, the first power storage device BAT1 is connected to the converter section 10 as a voltage conversion device via the system main relay SMR1 described later.

The voltage sensor 42 detects a voltage VB1 of the first power storage device BAT1, and outputs the detected value of the voltage VB1 to the ECU 30. The current sensor 52 detects a current I1 inputted to or outputted from the converter section 10 from or to the first power storage device BAT1, and outputs the detected value thereof to the ECU 30. The values of the voltage VB1 and the current I1 are used for the calculation of a state of charge SOC described later in the ECU 30.

The system main relay SMR1 includes a contact G1 connected between a negative electrode of the first power storage device BAT1 and a negative electrode line NL1, a contact P1 connected in series to a limiting resistor R1 between the negative electrode of the first power storage device BAT1 and the negative electrode line NL1, and a contact B1 connected between a positive electrode of the first power storage device BAT1 and a positive electrode line PL1. The ON/OFF states of the contacts G1, P1, and B1 are individually controlled according to a control signal SM1 given from the ECU 30.

Note that, at the time of start of the hybrid vehicle 100, the ECU 30 brings the contacts B1 and P1 of the system main relay SMR1 into the ON state to allow conduction of electricity and thereby performs precharge of the capacitors C1 and C2 and, when the precharge is completed, the ECU 30 brings the contact P1 into the OFF state to open the contact P1 after bringing the contact G1 into the ON state to allow the conduction of electricity. By switching between the ON/OFF states of the contacts G1, P1, and B1 in this order, an inrush current can be prevented and the system main relay SMR1 allows electric power to be supplied to an inverter section 20.

The capacitor C1 is provided between the positive electrode line PL1 and the negative electrode line NL1, and reduces a voltage fluctuation between the positive electrode line PL1 and the negative electrode line NL1.

The voltage sensor 46 detects the voltage between the contacts of the capacitor C1, i.e., the value of a voltage VL of a positive electrode line PL2 with respect to the negative electrode line NL1, and outputs the detected value thereof to the ECU 30. The current sensor 56 detects the value of a current I3 flowing to a reactor 15, and outputs the detected value thereof to the ECU 30.

The converter section 10 includes upper and lower arm switching elements 11 and 12, upper and lower arm diodes 13 and 14, and the reactor 15. The upper and lower arm switching elements 11 and 12 are connected in series between a positive electrode line PL3 and the negative electrode line NL1.

To the upper and lower arm switching elements 11 and 12, the upper and lower arm diodes 13 and 14 are respectively connected in antiparallel. The reactor 15 is connected between the connection node of the upper and lower arm switching elements 11 and 12 and the positive electrode line PL1.

In the present embodiment, as the switching element, it is possible to use, e.g., an insulated gate bipolar transistor (IGBT), a power metal oxide semiconductor (MOS) transistor, or a power bipolar transistor.

The converter section 10 is basically controlled such that the upper and lower arm switching elements. 11 and 12 are turned ON/OFF complementarily and alternately in each switching cycle. During a step-up operation, the converter section 10 performs the step-up operation such that direct current (DC) power having the voltage VL outputted by the first power storage device BAT1 has a voltage VH. This step-up operation is performed by giving electromagnetic energy accumulated in the reactor 15 during the ON period of the lower arm switching element 12 to the positive electrode line PL3 via the upper arm switching element 11 and the upper arm diode 13 connected in antiparallel thereto.

In addition, during a step-down operation, the converter section 10 performs the step-down operation such that the DC power having the voltage VH outputted by the inverter section 20 has the voltage VL. This step-down operation is performed by giving the electromagnetic energy accumulated in the reactor 15 during the ON period of the upper arm switching element 11 to the negative electrode line NL1 via the lower arm switching element 12 and the lower arm diode 14 connected in antiparallel thereto. A voltage conversion ratio (a ratio between VH and VL) in each of the step-up operation and the step-down operation is controlled by an ON period ratio (a duty ratio) between the upper and lower arm switching elements 11 and 12. For example, when the upper arm switching element 11 is fixed to ON and the lower arm switching element 12 is fixed to OFF, it is possible to satisfy VH=VL (the voltage conversion ratio=1.0).

The voltage sensor 48 detects the voltage between the contacts of the capacitor C2, and outputs the detected value of the voltage VH to the ECU 30. The capacitor C2 is provided between the positive electrode line PL3 and the negative electrode line NL1, and reduces the voltage fluctuation between the positive electrode line PL3 and the negative electrode line NL1.

In addition, the converter section 10 is electrically connected to the inverter section 20 with the positive electrode line PL3 and the negative electrode line NL1.

The positive electrode line PL2 and a negative electrode line NL2 are provided with the system main relay SMR2, and the supply and the shutoff of electric power from the second power storage device BAT2 to the drive device are switched.

The system main relay SMR2 includes a contact G2 connected between the negative electrode of the second power storage device BAT2 and the negative electrode line NL2, and a contact B2 connected to the positive electrode of the second power storage, device BAT2. However, the system main relay SMR2 does not include the limiting resistor R1 and the contact P1 included in the system main relay SMR1. The ON/OFF states of the contacts G2 and B2 are individually controlled according to a signal SM2 given from the ECU 30.

To the positive electrode line PL3 and the negative electrode line NL1, the second power storage device BAT2 is connected via the positive electrode line PL2 and the negative electrode line NL2.

When the voltage VH exceeds a voltage VB2, the control signal SM2 for performing a closing operation is outputted from the ECU 30, and the contacts B2 and G2 are closed. With this, the system main relay. SMR2 supplies the current from the second power storage device BAT2 to motor generators MG1 and MG2.

The backflow prevention circuit 35 is provided on the positive electrode line PL2. The backflow prevention circuit 35 is configured by, e.g., a diode D3, and is connected with the direction from the positive electrode line PL2 to the positive electrode line PL3 serving as a forward direction.

As a result, for example, in a case where the increase of the voltage VH is required at the time of a high load, it is possible to prevent the current that should flow to the motor generator MG2 from flowing in the direction of the second power storage device BAT2 unintentionally. Note that, in this embodiment, although the diode D3 is used as the backflow prevention circuit, the configuration of the backflow prevention circuit is not particularly limited thereto, and any circuit device may be used as long as the circuit device is configured so as not to be brought into the ON state to be closed unless the voltage VH detected by the voltage sensor 48 becomes a predetermined value or higher. In addition, the disposition of the circuit device for the backflow prevention, the number of switching elements, and the value of the voltage that permits or prohibits the conduction of electricity are not particularly limited.

To both ends of the second power storage device BAT2, the voltage sensor 44 is connected. The voltage sensor 44 detects the value VB2 of the voltage V2 of the second power storage device BAT2, and outputs the detected value to the ECU 30. The current sensor 54 detects the value of a current I2 inputted to/outputted from the second power storage device BAT2, and outputs the detected value to the ECU 30. Subsequently, the ECU 30 compares the value of the voltage VB2 with the value of the voltage VH detected by the voltage sensor 48 to switch between the first power storage device BAT1 and the second power storage device BAT2.

The first power storage device BAT1 includes a high-output battery, while the other second power storage device BAT2 includes a high-capacity battery. Note that, as, the first power storage device BAT1, it is possible to use, e.g., a secondary battery having the maximum output power larger than that of the second power storage device BAT2. By using the first power storage device BAT1 in HV traveling described later and configuring the first power storage device BAT1 by the secondary battery capable of inputting and outputting a relatively large current, it is possible to provide sufficient output and charging performance during acceleration/deceleration traveling.

As the second power storage device BAT2, it is possible to use the secondary battery having a power storage capacity larger than that of the first power storage device BAT1. By supplying electric power directly to the inverter section 20 without the intervention of a power conversion device such as the converter section 10, it is possible to use the secondary battery as the power source that has a small power conversion loss and excellent energy efficiency during constant speed traveling having a small change in speed when a vehicle travels on an express way.

With this, by using the first power storage device BAT1 and the second power storage device BAT2 appropriately, it is possible to configure the DC power source having high power and the large capacity.

In addition, the combination of the first power storage device BAT1 and the second power storage device BAT2 may be the combination of secondary batteries of different types, and a large-capacity capacitor may also be used in at least one of the first power storage device BAT1 and the second power storage device BAT2.

The drive device 90 has an engine 2, the motor generators MG1 and MG2 as rotary electric machines, the inverter section 20 that supplies electric power to the motor generators MG1 and MG2, a power dividing mechanism 4 that couples the engine 2 and the motor generators MG1 and MG2, and a wheel 6 that is coupled to the power dividing mechanism 4 and can rotate with the power from the engine 2 and the motor generator MG1 and MG2.

The motor generators MG1 and MG2 are controlled by the ECU 30 described later. The ECU 30 may be divided into a plurality of ECUs, e.g., may be configured to have an engine ECU (not shown) as a result of the division, and the engine 2 may be controlled by an engine control signal outputted from the engine ECU.

The hybrid vehicle 100 travels with a driving force from at least one of the engine 2 and the motor generator MG2. That is, one or both of the engine 2 and the motor generator MG2 are automatically selected as a drive source according to the traveling state.

In addition, the motor generator MG2 is rotationally driven with the electric power supply from the inverter section 20. The inverter section 20 is controlled with a control signal PWI, and adjusts the rotational torque of the motor generator MG2.

The rotational driving force of the motor generator MG2 and the rotational driving force of the engine 2 cause the wheel 6 or the motor generator MG1 to rotate based on torque distribution by the power dividing mechanism 4 adjusted by the ECU 30. With this, it is possible to cause the hybrid vehicle 100 to travel or obtain the rotational electromotive force of the motor generator MG1.

Further, during motor traveling, in a case where the rotational torque that should be generated by the motor generator MG2 is insufficient, in principle, the ECU 30 starts the engine 2, and adds the rotational driving force of the engine 2 to the rotational driving force of the motor generator MG2 in the power dividing mechanism 4 to thereby compensate for the insufficiency of the rotational torque.

Additionally, the hybrid vehicle 100 of the present embodiment is provided with an external charging device 60 that charges the second power storage device BAT2 by using electric power from the electric power source outside the vehicle. The external charging device 60 includes a charger-side relay switch CHR, a body-side charging port 61, a charger 62, and a voltage sensor 63.

The charger 62 is connected to the body-side charging port 61, and is also connected to the second power storage device BAT2 via the charger-side relay switch CHR. In addition, the charger 62 receives alternating current (AC) power transmitted to the body-side charging port 61 from an external power source 70 by using a charging cable 80. Consequently, the charger 62 converts the received AC power to DC power, and supplies charging electric power to the second power storage device BAT2.

One terminal 65 of a contact BC of the charger-side relay switch CHR, is connected to the positive electrode of the second power storage device BAT2, while the other terminal is connected to an output terminal 67 of the charger 62. In addition, one terminal of a contact GC is connected to the negative electrode of the second power storage device BAT2, while the other terminal is connected to an output terminal 68 of the charger 62. There is provided a contact PC that is in parallel to the contact GC on the negative electrode side and is connected in series to the limiting resistor.

The voltage sensor 63 measures the voltage between the output terminals 67 and 68 of the charger 62, and outputs the measured value VCH to the ECU 30.

The charging cable 80 corresponds to electric vehicle supply equipment (EVSE) in Society of Automotive Engineer (SAE) Standards, and includes a connector section 81. The connector section 81 of the charging cable 80 is connected to the body-side charging port 61 provided in the hybrid vehicle 100, and electric power from the external power source 70 is transmitted to the hybrid vehicle 100.

Although the description will be given by showing the electric vehicle having the engine 2 as the vehicle in FIG. 1, the configuration of the vehicle is not limited thereto and, for example, the vehicle may also be an electric vehicle that travels only with a motor or an electric vehicle that does not have the external charging device 60 on the body, and the vehicle may also a hybrid vehicle that uses a fuel cell together with or instead of the engine 2. In addition, the shape, the type, and the number of drive sources are not particularly limited, and it is also, possible to use not only what is called a series/parallel-type plug-in hybrid vehicle in which the power dividing mechanism 4 is provided and the power of the engine 2 is distributed to the motor generator MG1 and the wheel 6 but also what is called a series-type hybrid vehicle in which the power of the engine 2 is used only for electric power generation by the motor generator MG1 and the driving force of the vehicle is generated by using only the motor generator MG2 or hybrid vehicles of different types.

The ECU 30 controls the power source system 50 and the inverter section 20 to adjust the driving force when the vehicle travels. The ECU 30 includes a prevention control section 32 that prevents the start of the engine 2 until the system main relay SMR2 is closed. In a case where the voltage VH detected by the voltage sensor 48 exceeds the voltage VB2, the ECU 30 outputs the control signal SM2 for closing the circuit to the system main relay SMR2.

In addition, a memory section 31 with which the rating predetermined value such as the voltage or the like, vehicle information, and a notification can be written or read may be provided in the ECU 30 or may also be connected to the ECU 30 from the outside.

Further, a notification device 40 is connected to the ECU 30. The notification device 40 performs an display output that uses characters, figures, and notification sound through a monitor output display section provided in a vehicle interior. The ECU 30 transmits an output signal for performing the display output to the notification device 40. With the input of the display output, the notification device 40 notifies a user of a state in which the vehicle can travel visually or through audio by using an audio output and turning on an indicator lamp.

The vehicle ECU that is not shown generates a request output PR to the first power storage device BAT1 and the second power storage device BAT2. The ECU 30 generates a control signal PWC for driving the converter section 10 based on the voltages VB1 and VB2 and the voltages VL and VH according to the depression amount of an accelerator pedal, a vehicle speed, and the request output PR, and outputs the generated control signal PWC to the converter section 10.

In addition, the ECU 30 generates the control signal PWI based on the rotational speed current of the motor generator MG2 and the voltage VH. When the generated control signal PWI is outputted to the inverter section 20, the inverter section 20 adjusts the rotational driving force of each of the motor generators MG1 and MG2.

The ECU 30 further determines the state of charge SOC indicative of the remaining capacity of each of the first power storage device BAT1 and the second power storage device BAT2 and an output power upper limit value WOUT (in watts) thereof based on the voltages VB1 and VB2 and the current values I1 and I2 detected by the current sensors 52 and 54. The value indicative of the state of charge. SOC is defined by the ratio of an actual charge capacity to a rating capacity and, for example, the state of charge SOC is defined as 100% when the power storage device is fully charged, and the state of charge SOC is defined as 0% when the power storage device is completely discharged.

The hybrid vehicle 100 of the embodiment is capable of traveling while switching between what is called HV traveling in which the hybrid vehicle 100 travels while switching between the engine 2 and the motor generator MG2, and what is called EV traveling in which the hybrid vehicle 100 travels with the rotational driving force of the motor generator MG2.

Figure 2:
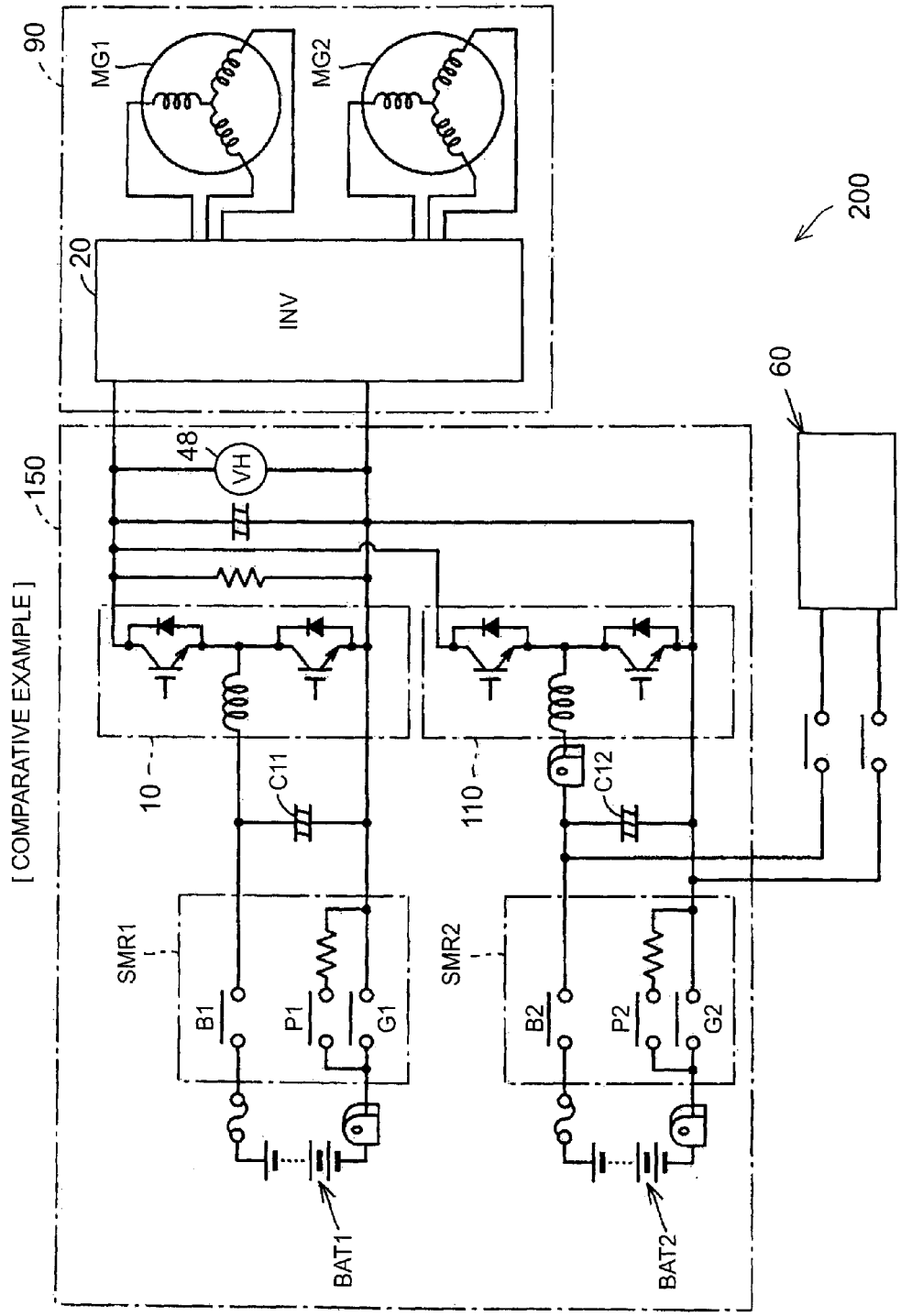
FIG. 2 is a view showing the configuration of the hybrid vehicle on which a power source system of a comparative example is mounted.

Next, a comparative example will be described. FIG. 2 is a view showing the configuration of a hybrid vehicle 200 on which a power source system 150 of the comparative example is mounted. Note that the same part as that of the embodiment is designated by the same reference numeral and the description thereof will not be repeated.

The hybrid vehicle 200 of the comparative example is different from the hybrid vehicle of FIG. 1 in that, as a part of the power source system 150, a second converter section 110 that converts the voltage of electric power supplied to the inverter section 20 is provided on the side of the second power storage device BAT2 similarly to the first power storage device BAT1.

In the thus configured hybrid vehicle 200 of the comparative example, in the EV traveling in which the hybrid vehicle 200 travels only with the driving force from each of the motor generators MG1 and MG2, together with or without the supply of electric power from the converter section 10, electric power of the second power storage device BAT2 of which the voltage is increased by the second converter section 110 is supplied to the inverter section 20.

Figure 3:
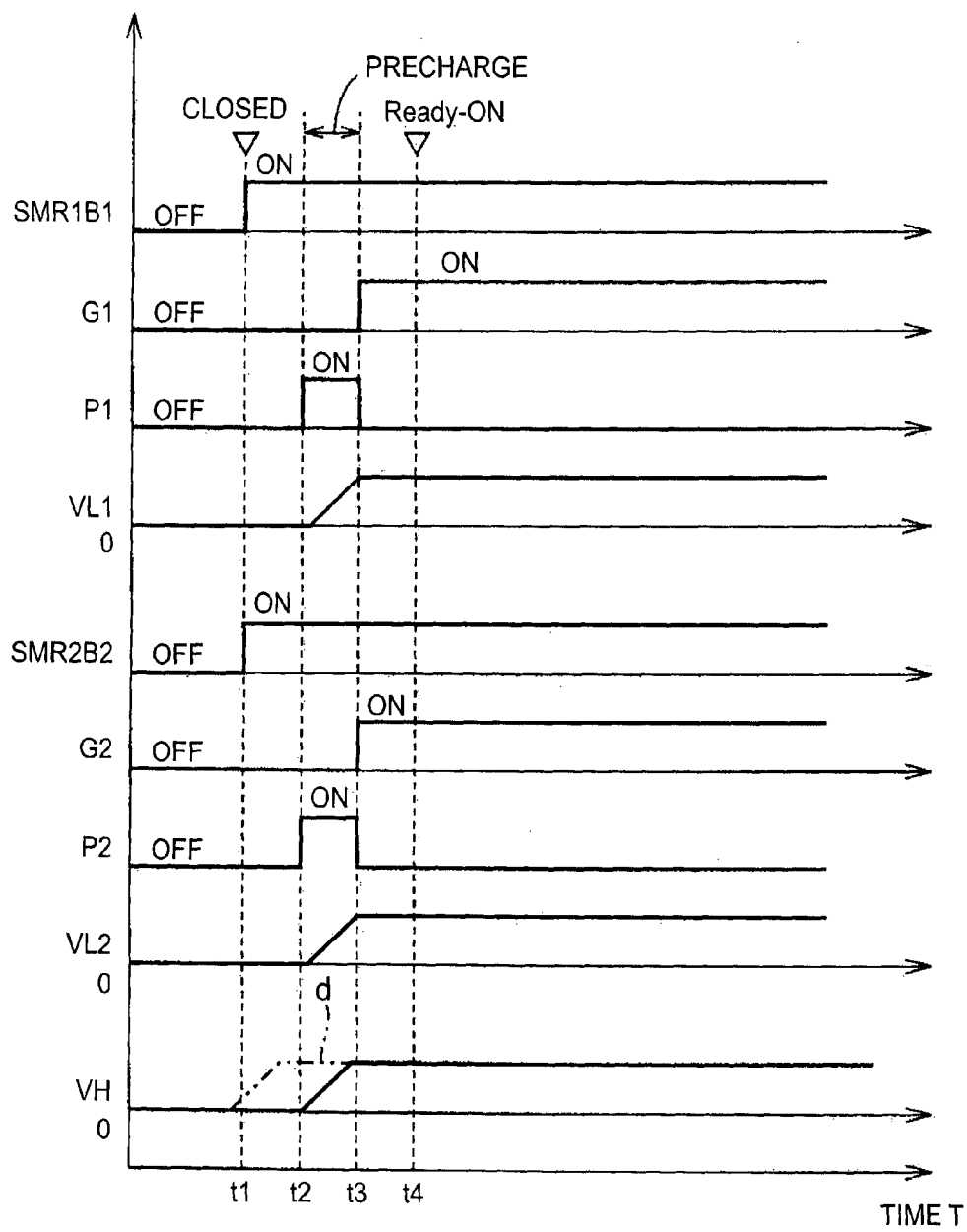
FIG. 3 is a time chart showing a change in voltage caused by closing and opening of switches in the comparative example.

FIG. 3 is a time chart showing a change of each of the voltages VL1, VL2, and VH caused by closing and opening of the system main relays SMR1 and SMR2 at the time of activation of the power source system 50 in the comparative example.

In the hybrid vehicle 200, during a time period from the start of the vehicle to the establishment of a Ready-ON state in which a preparation for starting control operations required for traveling in individual parts is completed, the welding check of each contact of the system main relays SMR1 and SMR2 is performed. For example, the welding check is performed by switching between the closed state and the opened state of each contact.

As shown in FIG. 3, before the start of the vehicle (before time t1), the converter section 10 and the second converter section 110 are gate-blocked, and the voltage VH is about 0 V, and is not increased.

At time t1, the respective contacts B1 and B2 of the system main relays SMR1 and SMR2 are closed. At this point, the voltage VH does not rise in a case where the other contacts are normal and are opened, and the voltage VH rises as indicated by a two-dot chain line d in a case where welding occurs. As a result, by using the change of the voltage VH in this state, it is possible to perform the welding check of contacts G1 and G2 or P1 and P2.

Next, in order to perform precharge of capacitors C11 and C12, the contact P1 of the system main relay SMR1 and the contact P2 of the system main relay SMR2 are closed at time t2. In a case where there is no welding at each relay contact and the connection state is normal, the voltages VL1 and VL2 start to rise at this point, and the voltage VH becomes equal to the higher one of the voltages VL1 and VL2.

At time t3, when the precharge is ended, the respective contacts G1 and G2 of the system main relays SMR1 and SMR2 are closed, the respective contacts P1 and P2 of the system main relays SMR1 and SMR2 are opened, and the Ready-ON state is established.

In the configuration of the comparative example, by using the two converter sections of the converter section 10 and the second converter section 110 having the same configuration, electric power is supplied to the same load. The number of converter sections increases as the number of power storage devices connected in parallel to the load increases.

In a case where the power storage devices having different power storage capacities and output voltages are connected in parallel to the load, it is necessary to provide the relay switch including the limiting resistor (hereinafter referred to as a relay switch with a precharge function) such that the inrush current does not flow in.

In addition, in the welding check, in the case where the voltage VH rises as indicated by the two-dot chain line d in FIG. 3, there is a possibility that the contacts G1 and G2 or the contacts P1 and P2 of the system main relays SMR1 and SMR2 are welded, but it is not possible to identify the location.

If time for the welding check for the system main relay SMR1 is made different from time for the welding check for the system main relay SMR2, and the welding check for the system main relay SMR1 and the welding check for the system main relay SMR2 are performed separately, it takes time before the precharge of the capacitors corresponding to the system main relays SMR1 and SMR2 is completed and the Ready-ON state that allows traveling is established.

Further, in a case where the Ready-ON state is defined as the state in which the system main relays SMR1 and SMR2 are closed, it requires time to increase the value of the voltage VH on the side of the first power storage device BAT1 to the value of the voltage V2 (VB2) on the side of the second power storage device BAT2. As a result, a time lag between the start of the vehicle and the establishment of the Ready-ON state is increased.

In addition, in each of the system main relays SMR1 and SMR2, since the relay switch including the limiting resistor is used at the contact P, the number of components is increased and the configuration of the circuit becomes complicated.

In contrast to this, in the power source system 50 provided in the hybrid vehicle 100 of FIG. 1, the second converter section 110 is omitted in order to reduce a switching loss to improve power supply efficiency. Then, the voltage VL2 outputted from the second power storage device BAT2 is set to be higher than the voltage VL1 outputted from the first power storage device BAT1. For example, when the voltage VL1 applied from the first power storage device BAT1 is assumed to be about 200 V, the voltage VL2 is set to about 450 V.

Further, when the configuration is adopted in which the power supply efficiency is improved by directly connecting the second power storage device BAT2 to the inverter section 20 without providing the second converter section 110 on the side of the second power storage device BAT2, there is a possibility that the inrush current from the side of the second power storage device BAT2 flows into the path to the load.

To cope with this, in the power source system 50 of the embodiment shown in FIG. 1, in a case where the second power storage device BAT2 having a different voltage is connected in parallel to the path to which the first power storage device BAT1 is connected, after properly adjusting the voltage applied between the terminals of the system main relay SMR2 such that no-load energization is performed by using the converter section 10 on the side of the first power storage device BAT1, the second power storage device BAT2 is connected. With this, the occurrence of the inrush current is prevented while the time lag at the time of start of traveling is eliminated by using the first power storage device BAT1.

Consequently, the ECU 30 closes the system main relay SMR1 with the activation of the power source system 50, and closes the system main relay SMR2 in response to the voltage VH applied to the drive device 90 being increased to the predetermined voltage V2 (VB2).

Subsequently, by using such a relay closing procedure and the diode D3 as the backflow prevention circuit in combination, the second power storage device BAT2 having a relatively high voltage is directly connected to the path to the load while the backflow is prevented, and the no-load energization is performed.

Figure 4:
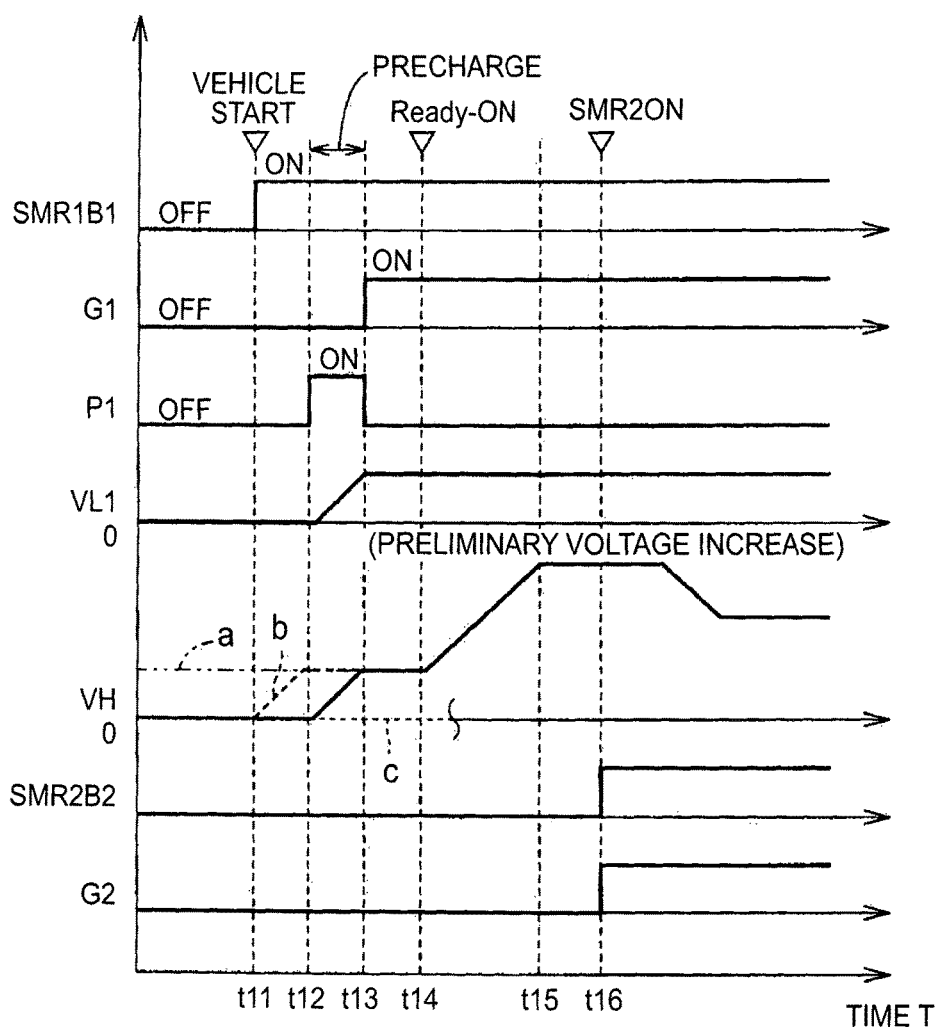
FIG. 4 is a time chart showing the detail of the operation of the power source system according to the embodiment.

FIG. 4 is a time chart showing the detail of the operation in a case where processing is performed by the power source system 50 of the embodiment.

In the hybrid vehicle 100, with the control by the ECU 30, at time t11, at the start of the vehicle, an activation sequence of the power source system 50 including the welding check is started.

In a case where charges after the previous traveling are not completely removed and the voltage VH is not lowered as indicated by a two-dot chain line a in the drawing before time t11 when the contact B1 of the system main relay SMR1 is closed, the ECU 30 determines that there is a high possibility that the contact B1 and the contact G1 of the system main relay SMR1 are welded. At time t11, when the control signal SM1 is outputted from the ECU 30 in response to a user's activation operation, the contact B1 of the system main relay SMR1 is closed. At this point, in a case where the voltage VH starts to rise as indicated by a broken line b, the ECU 30 determines that there is a high possibility that the contact P is welded. From time t12 to time t13, the contact P1 is closed with the control signal SM1 from the ECU 30, and the precharge of the capacitor C1 is performed.

As indicated by a broken line c, in a case where the precharge is not performed even when the control signal SM1 for closing the contact P1 is outputted from the ECU 30, there is a high possibility that a broken wire or an abnormality that the contacts P1 and B1 of the system main relay SMR1 are kept opened occurs. In the case where the possibility of the broken wire is high, it is desirable to perform an inspection with high accuracy, e.g., an inspection that uses dedicated external diagnosis equipment additionally.

The ECU 30 of the hybrid vehicle 100 closes the system main relay SMR1 at the time of the activation before closing the system main relay SMR2, and monitors the voltage VH using the voltage sensor 48 to perform the diagnosis of the abnormality of the system main relay SMR1 including the abnormality described above.

In the embodiment, at the time point when the system main relay SMR1 is closed, the Ready-ON state is assumed to be established. Accordingly, when the precharge is completed at time t13 and the contacts B1 and G1 of the system main relay SMR1 are closed, the Ready-ON state can be established at time t14.

Subsequently, preliminary voltage increase is started with the control signal PWC outputted to the converter section 10 from the ECU 30 and, at the same time, an output signal for performing the display output is transmitted to the notification device 40 from the ECU 30. With this, the notification device 40 notifies the user that the vehicle can travel.

At time t15, when the increased voltage VH exceeds the value of the voltage V2 (VB2) of the second power storage device BAT2, the contacts B2 and G2 of the system main relay SMR2 are closed at time t16. Thus, by defining the state in which only the system main relay SMR1 is in the ON state as the Ready-ON state, it is possible to reduce time required from the start of the vehicle to the establishment of the Ready-ON state.

Furthermore, in this embodiment, since it is not necessary to perform the welding check of the system main relay SMR2 before the Ready-ON state is established, it is possible to further reduce the time.

Figure 5:
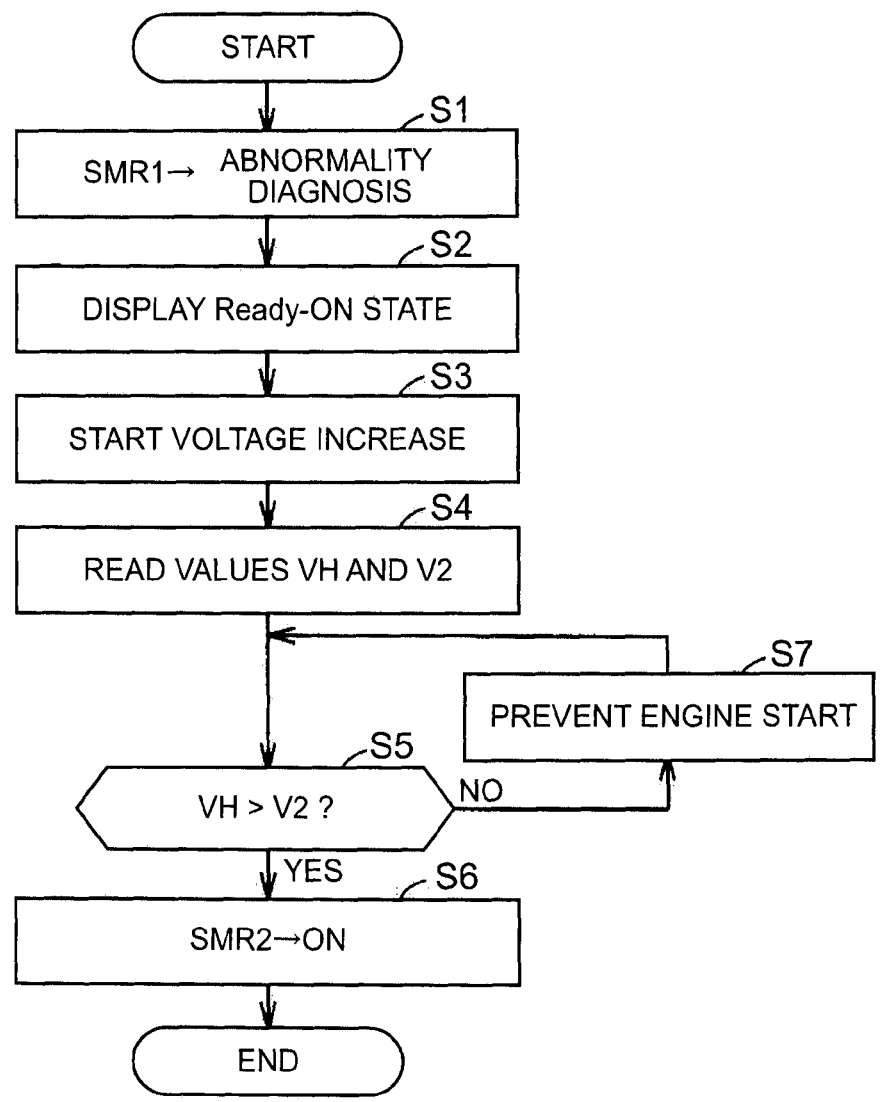
FIG. 5 is a flowchart for explaining a control process of the power source system according to the embodiment.

FIG. 5 is a flowchart for explaining a control process of the power source system 50 according to the embodiment.

When the control process is started in, response to the activation operation of the user, in step S1, the ECU 30 outputs the control signal SM1 for closing the system main relay SMR1. The individual contacts B1, G1, and P1 of the system main relay SMR1 are successively closed while being subjected to the above-described abnormality diagnosis.

When the system main relay SMR1 is closed, the Ready-ON state is established, and a state in which the traveling can be immediately started by using electric power from the first power storage device BAT1 is established. That is, it is possible to cause the vehicle to travel by the motor traveling by rotationally driving the motor generator MG2 by using only electric power from the first power storage device BAT1 without the supply of electric power from the second power storage device BAT2.

In step S2, the ECU 30 transmits the information that the system main relay SMR1 is closed with the control signal SM1 and the Ready-ON state is established to the notification device 40.

In step S3, the ECU 30 generates the control signal PWC based on the given request output PR, controls the converter section 10, and increases the voltage VH applied to the inverter section 20.

Next, in step S4, the ECU 30 acquires the value of the voltage VH of the voltage sensor 48 and the value of the voltage VB2 of the voltage sensor 44. The value of the voltage V2 of the second power storage device BAT2 may be the value of the voltage VB2 or the average value of the voltage VB2 during a predetermined time period.

In step S5, the ECU 30 compares the values of the voltages VH and V2, and determines whether or not the value of the voltage VH exceeds the value of the voltage V2. In a case where the value of the voltage VH exceeds the value of the voltage V2 (YES in step S5), the ECU 30 advances the process to the next step S6.

In step S6, when the control signal SM2 is outputted, the contacts B2 and G2 are closed.

Thus, in the case where the voltage V2 of the second power storage device BAT2 is higher than the voltage VL, the closing of the system main relay SMR2 is prohibited until the voltage VL of the positive electrode line PL3 is increased to the value of the voltage VH by the converter section 10, and the contacts B2 and G2 of the system main relay SMR2 are closed with the control signal SM2 in response to the voltage VH exceeding the voltage V2. With this, the first power storage device BAT1 and the second power storage device BAT2 are connected in parallel to the inverter section 20.

In the embodiment, the value of the voltage VB2 as the actually measured value sent from the voltage sensor 44 and the value of the voltage VH detected by the voltage sensor 48 are directly compared, and are used in the determination in the ECU 30. With this, it is possible to perform switching excellent in responsiveness.

Between the system main relay SMR2 and the inverter section 20, the second converter section 110 shown in the comparative example is not provided. As a result, since the second power storage device BAT2 can be directly connected to the inverter section 20, it is possible to eliminate the switching loss in the voltage conversion operation by the second converter section 110 to improve the electric power efficiency. At this point, even when the system main relay SMR2 is closed in the state in which the voltage VH exceeds the voltage V2, the backflow of the current to the second power storage device BAT2 is blocked by the diode D3 of the backflow prevention circuit 35.

The user is able to know that the power supply to the motor generator MG1 is allowed at the timing when the system main relay SMR1 is closed to be brought into the ON state. As a result, it is possible to start the traveling of the hybrid vehicle 100 before the completion, of connection of the second power storage device BAT2 by the system main relay SMR2.

In addition, in a case where the voltage VH does not exceed the voltage V2 (NO in step S5), the ECU 30 advances the process to step S7. In step S7, the prevention control for preventing the start of the engine 2 is executed by the prevention control section 32.

The output of the motor generator MG2 is limited in a case where the voltage VH applied to the inverter section 20 is not sufficiently high, and hence, in order to compensate for the insufficiency of the output of the motor generator MG2, the engine 2 becomes easy to start. When the engine 2 is easy to start, there is a possibility that vibrations and noises involved in the engine start are generated and an emission deteriorates. Further, there is a user's request for continuing the motor traveling without starting the engine 2 if possible during the EV traveling.

As the countermeasure against this, the ECU 30 performs a control in which the start condition of the engine 2 is changed from the start condition thereof during normal traveling such that the engine 2 becomes difficult to start. Specifically, in the present embodiment, the output power upper limit value WOUT of the first power storage device BAT1 is temporarily increased to be larger than a value during the normal traveling RA.

Figure 6:
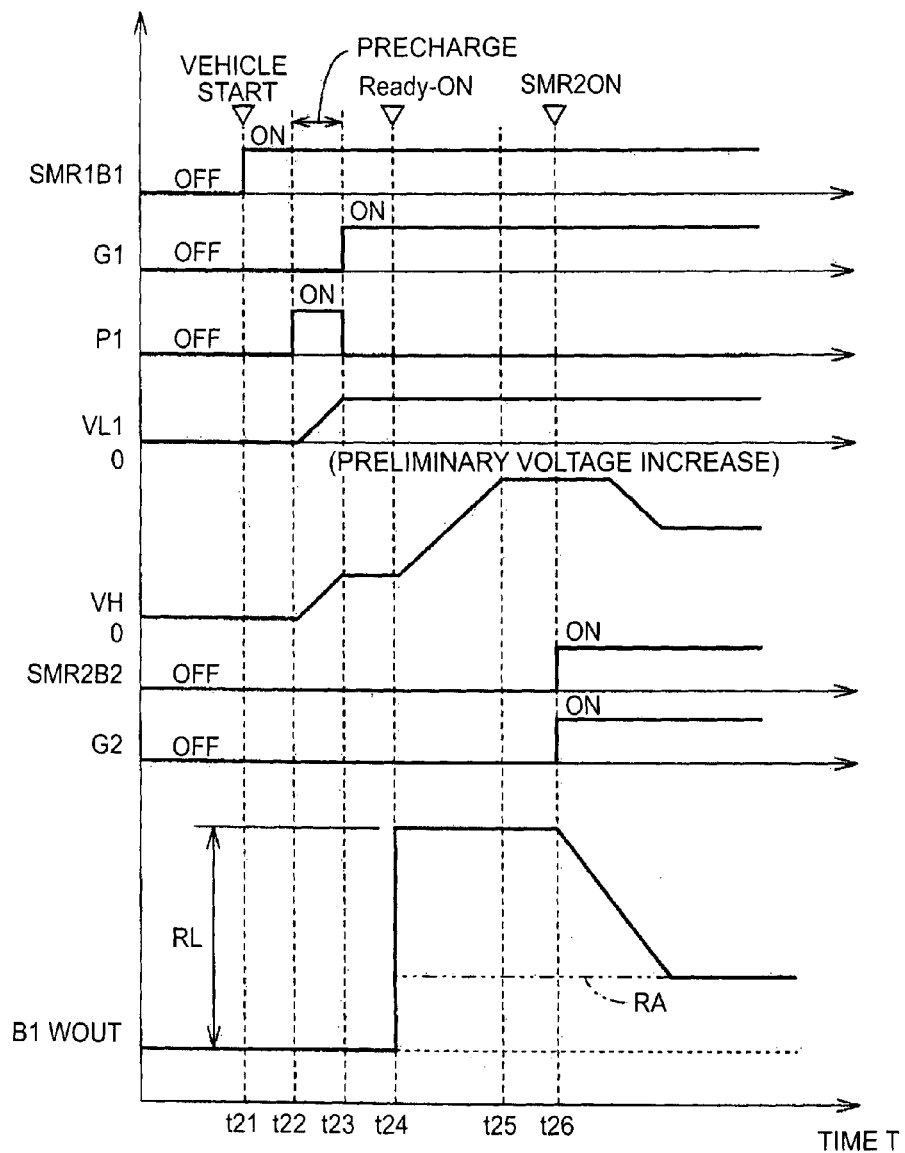
FIG. 6 is a time chart in a case where a start prevention process of FIG. 5 is executed.

FIG. 6 is a time, chart in a case where the start prevention process is executed. Note that, the section from time t21 to time t24 is the same as the section from time t11 to time t14 of FIG. 4 so that the description thereof will not be repeated.

At time t24 when the system main relay SMR1 is closed and the Ready-ON state is, established, the ECU 30 sets the output power upper limit value WOUT of the first power storage device BAT1 to a value RL larger than the value during the normal traveling RA using the prevention control section 32.

With this, electric power that can be outputted from the first power storage device. BAT1 is temporarily increased, and hence it is possible to increase the voltage VH early, and increase the current amount supplied to the motor generator MG2.

As a result, when the hybrid vehicle 100 travels only with the supply of electric power by the first power storage device BAT1, in a case where the voltage applied to the inverter section 20 is low at the time of start of the hybrid vehicle 100, the engine 2 usually becomes easy to start. However, even in such a case, the drive device 90 continues traveling only with the driving force of the motor generator MG2 without starting the engine 2.

During the prevention control by the ECU 30, since the motor traveling is continued, the vibrations and the noises involved in the engine start are not generated and acceleration can be performed smoothly. Further, especially during the EV traveling, it is possible to continue the EV traveling state as long as possible without starting the engine 2 to reflect the user's request for continuing the motor traveling, and achieve excellent drivability.

At time t26, when the value of the voltage VH reaches the value of the voltage-V2 of the second power storage device BAT2, the control signal SM2 is outputted from the ECU 30, and the contacts B2 and G2 of the system main relay SMR2 are closed. When the system main relay SMR2 is closed, the prevention control section 32 returns the output power upper limit value WOUT from the increased value RL to the value during the normal traveling RA. At the time of this returning, a rate limit process for preventing a sudden change is performed.

Figure 7:
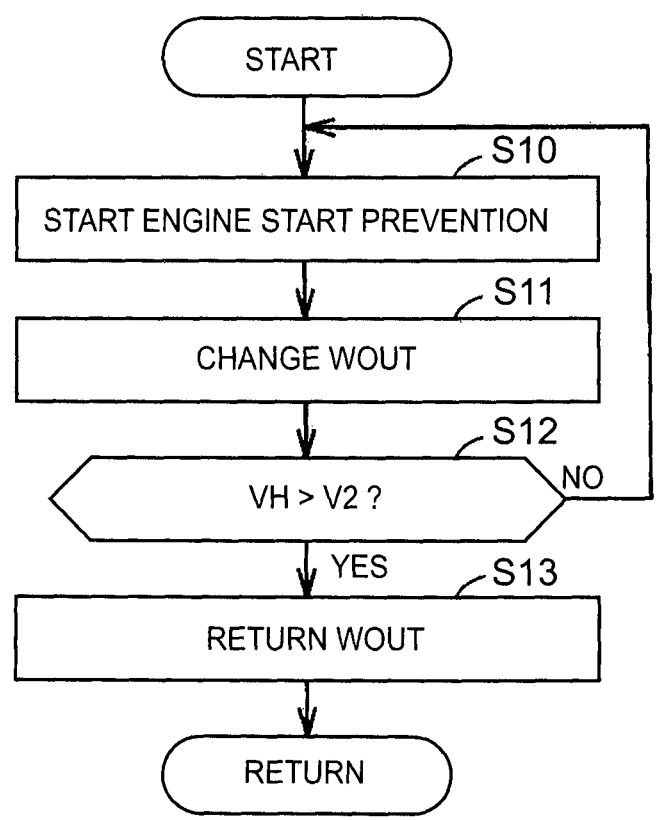
FIG. 7 is a flowchart specifically showing the start prevention process of FIG. 6.

FIG. 7 is a flowchart specifically showing the start prevention of the engine 2 of the embodiment. When the control process by the ECU 30 advances to step S10 from step S7 of FIG. 5, the prevention control of the start of the engine 2 is started by the prevention control section 32.

Subsequently, in step S11, in order to prevent the unintentional start of the engine 2 for compensating for the insufficiency of the torque of the motor generator MG2, the output power upper limit value WOUT of the first power storage device BAT1 is changed to be higher than the normal value RA.

By setting the output power upper limit value WOUT to be higher than the normal value RA, the traveling range by the motor generator MG2 is enlarged, and hence the start of the engine 2 is prevented. Note that the output power upper limit value WOUT can fluctuate depending on temperature conditions and the state of charge SOC.

In step S12, the ECU 30 compares the voltage VH and the voltage V2, and determines whether or not the voltage VH exceeds the voltage V2.

In a case where the voltage VH does not exceed the voltage V2 (NO in step S12), the ECU 30 returns the process to step S10, arithmetic processing is repeated in the prevention control section 32, and the prevention control of the start of the engine 2 by changing the output power upper limit value WOUT is continued.

In addition, in a case where the value of the voltage VH exceeds the value of the voltage V2 (YES in step S12), the ECU 30 advances the process to step S13, and returns the output power upper limit value WOUT to the normal value RA. Subsequently, the process is returned to step S5 in the main routine shown in FIG. 5.

In the present embodiment, the ECU 30 of the hybrid vehicle 100 closes the system main relay SMR1 when the power source system 50 is activated, and closes the system main relay SMR2 in response to the voltage VH applied to the drive device 90 being increased to the predetermined voltage V2.

As a result, it is possible to properly connect the second power storage device BAT2 to the first power storage device BAT1 using the no-load energization, and it is possible to omit the second converter section 110 or the like to simplify the configuration.

Subsequently, when the system main relay SMR1 is closed, the state in which the traveling can be started by using electric power from the first power storage device BAT1 is established.

The user can recognize that a state in which the motor traveling can be started by rotationally driving the motor generator MG2 without the supply of electric power from the second power storage device BAT2 is established using the notification device 40.

Consequently, the user does not feel the time lag between the start of the hybrid vehicle 100 and the establishment of the state in which the hybrid vehicle 100 can travel, and hence the user can start the traveling smoothly.

In addition, after the start of the traveling, in response to the voltage VH applied to the drive device 90 exceeding the predetermined voltage V2, the system main relay SMR2 is closed. As a result, it is possible to increase the cruising distance together with the first power storage device BAT1 as the high-output battery on the side of the system main relay SMR1 or by switching to the second power storage device BAT2 as the high-capacity battery.

The backflow prevention circuit is configured to include the diode D3. As a result, it is possible to implement the configuration in which the current does not flow back to the second power storage device BAT2 even when the voltage VH exceeds the predetermined voltage V2. Consequently, it is possible to reduce the frequency of the welding check of the system main relay SMR2, and further reduce the time lag from the start of the vehicle by not performing the welding check before the Ready-ON state is established.

The start of the engine 2 is prevented by the prevention control section 32 until the system main relay SMR2 is closed. As a result, even in a situation in which the engine 2 is normally started, the drive device 90 can continue the traveling only with the driving force of the motor generator MG2 without starting the engine 2, and maintain smooth drivability by the motor traveling.

Next, a modification of the present embodiment will be described. As another example of the method of preventing the start of the engine 2, there can be used a method called changing of an upper limit guard in which the value of the rotational torque of the motor generator MG2 is changed to an upper limit value NL of the rotational torque lower than a normal upper limit value NA such that the rotational torque of the motor generator MG2 does not become insufficient. Hereinafter, an example of the changing of the upper limit guard of the torque limit will be described in detail in the modification.

FIG. 8 is a time chart in a case where the start prevention process of the modification is executed. Note that the section from time t31 to time t34 is the same as the section from time t11 to time t14 of FIG. 4 so that the description thereof will not be repeated.

At time t34 when the ECU 30 closes the system main relay SMR1 to establish the Ready-ON state, the prevention control section 32 reduces the upper limit value of the rotational torque indicated by a one-dot chain line in FIG. 8 from the value NA during the normal traveling of the one-dot chain line to the value NL indicated by a solid line. The value NL is the value with which the output fluctuation of the first power storage device BAT1 by the output torque does not exceed WOUT.

With the operation described above, the torque of the motor generator MG2 is set so as not to exceed the output power upper limit value WOUT, and hence the insufficiency of the torque is not caused and the engine 2 is not started.

That is, as the result, the same state as the state in which the total request output PR inputted to the ECU 30 is limited is established, and the start of the engine 2 is prevented from time t34 when the Ready-ON state is started to time t35 when the value of the voltage VH>the value of the voltage VB is satisfied and the system main relay SMR2 is closed.

When the contacts B2 and G2 of the system main relay SMR2 are closed at time t35, the prevention control section 32 returns the upper limit guard of the torque limit of the motor generator MG2 to the value NA as the normal upper limit value.

FIG. 9 is a flowchart specifically showing the start prevention process of the modification. When NO is selected at step S5 of FIG. 5, the ECU 30 causes the prevention control section 32 to start the prevention process of the start of the engine 2 at step S20.

In step S21, the change control of the upper limit value of the rotational torque of the motor generator MG2 is performed by the prevention control section 32, and the upper limit value is changed from the normal upper limit value NA of the rotational torque to the value NL lower than the value NA.

In step S22, the ECU 30 determines whether or not the value of the voltage VH exceeds the value of the voltage V2 using the prevention control section 32.

In a case where the value of the voltage VH does not exceed the value of the voltage V2 (NO in step S12), the ECU 30 returns the process to step S20, repeats the prevention control process, maintains the upper limit value of the rotational torque at NL, and continues the prevention of the start of the engine 2.

In a case where the value of the voltage VH exceeds the value of the voltage V2 (YES in step S12), the ECU 30 advances the process to step S23.

In step S23, the ECU 30 returns the torque upper limit from the value NL to the normal value NA. Subsequently, the process is returned to step S5 in the main routine.

Note that, in the embodiment and its modification described above, the control in the ECU 30 is actually performed by a central processing unit (CPU), the CPU reads a program having the individual steps in the flowchart from a read only memory (ROM), and executes the read program to execute the process according to the flowchart. Consequently, the ROM corresponds to a recording medium allowing reading by the computer (CPU) in which the program having the individual steps in the flowchart is recorded. Note that an electronic component configured by hardware such as an application specific integrated circuit (ASIC) in which the program part is formed as a circuit may also be used.

The embodiment described thus far will be summarized again with reference to the drawings. As shown in FIG. 1, the hybrid vehicle 100 has the power source system 50, the drive device 90, and the ECU 30. The drive device 90 is configured to be driven with electric power supplied from the power source system 50. The ECU 30 is configured to control the power source system 50 and/or the drive device 90.

The power source system 50 includes the first power storage device BAT1, the converter section 10, the second power storage device BAT2, the system main relay SMR1, and the system main relay SMR2. The converter section 10 is configured to convert the voltage from the first power storage device BAT1. The second power storage device BAT2 is configured to be electrically connected to the path supplying the electric power subjected to the conversion in the converter section 10 to the drive device 90, and supply electric power to the drive device 90. The system main relay SMR1 is configured to switch between supply and shutoff of electric power between the first power storage device BAT1 and the converter section 10. The system main relay SMR2 is configured to switch between the supply and the shutoff of electric power from the second power storage device BAT2 to the drive device 90.

The ECU 30 of the hybrid vehicle 100 is configured to close the system main relay SMR1 with the activation of the power source system 50, and closes the system main relay SMR2 in response to the voltage VH applied to the drive device 90 being increased to the predetermined voltage V2.

Preferably, the ECU 30 may further include the notification device 40 that provides a notification that the vehicle can travel in response to the system main, relay SMR1 being closed.

Further preferably, the first power storage device BAT1 may include the high-output battery, and the second power storage device BAT2 may include the high-capacity battery.

Further preferably, the hybrid vehicle 100 may further include the backflow prevention circuit 35 configured to be connected between the drive device 90 and the system main relay SMR2 and prevent the current on the side of the drive device 90 from flowing toward the second power storage device BAT2, and the backflow prevention circuit 35 may be configured to include the diode D3.

Further preferably, the drive device 90 may be configured to include the motor generator MG1 as the load coupled to the engine 2, and the ECU 30 may be configured to prevent the start of the engine 2 until the system main relay SMR2 is closed.

Further preferably, the ECU 30 may be configured to prevent the start of the engine 2 by temporarily relaxing the output limit of the first power storage device BAT1.

Further preferably, the ECU 30 may be configured to prevent the start of the engine 2 by temporarily reducing the upper value NL of the rotational torque that can be outputted from the motor generator MG2.

In addition, the power source system 50 of the hybrid vehicle 100 supplies electric power to the motor generators MG1 and MG2. The power source system 50 has the first power storage device BAT1, the converter section 10, the second power storage device BAT2, the system main relay SMR1, the system main relay SMR2, and the ECU 30. The converter section 10 is configured to convert the voltage from the first power storage device BAT1. The second power storage device BAT2 is configured to be electrically connected to the path linking the converter section 10 and the motor generators MG1 and MG2, and be capable of supplying electric power to the motor generators MG1 and MG2. The system main relay SMR1 is configured to switch between the supply and the shutoff of electric power between the first power storage device BAT1 and the converter section 10. The system main relay SMR2 is configured to switch between, the supply and the shutoff of electric power from the second power storage device BAT2 to the motor generators MG1 and MG2. The ECU 30 is configured to close the system main relay SMR1 with the activation of the power source system 50, and close the system main relay SMR2 in response to the voltage applied to the motor generators MG1 and MG2 being increased to the predetermined voltage.

The invention claimed is:

1. A vehicle, comprising:
    a power source system including;
        a first power storage device;
        a voltage conversion device being configured to convert a voltage from the first power storage device;
        a second power storage device;
        a first switch configured to switch between supply and shutoff of electric power between the first power storage device and the voltage conversion device; and
        a second switch;
    a drive device configured to be driven with electric power supplied from the power source system, the drive device including a rotary electric machine as a load coupled to an engine, the second power storage device being electrically connected to a path that supplies electric power subjected to the conversion in the voltage conversion device to the drive device, the second power storage device being configured to supply electric power to the drive device, the second switch being configured to switch between supply and shutoff of electric power from the second power storage device to the drive device; and
    an electronic control unit configured to control the power source system and the drive device,
    the electronic control unit being configured to close the first switch with activation of the power source system and close the second switch in response to a voltage applied to the drive device being increased to a predetermined voltage, and the electronic control unit being configured to prevent a start of the engine until the second switch is closed.

2. The vehicle according to claim 1, wherein
    the electronic control unit further includes a notification device configured to provide a notification that the vehicle is able to travel in response to the first switch being closed.

3. The vehicle according to claim 1, wherein
    the first power storage device includes a high-output battery, and the second power storage device includes a high-capacity battery.

4. The vehicle according to claim 1, further comprising:
    a backflow prevention circuit connected between the drive device and the second switch, the backflow prevention circuit being configured to prevent a current on a side of the drive device from flowing toward the second power storage device, and the backflow prevention circuit including a diode.

5. The vehicle according to claim 1, wherein
    the electronic control unit is configured to prevent the start of the engine by temporarily relaxing ah output limit of the first power storage device.

6. The vehicle according to claim 1, wherein
    the electronic control unit is configured to prevent the start of the engine by temporarily reducing an output torque upper limit value of the rotary electric machine.

7. A power source system for supplying electric power to a rotary electric machine coupled to an engine, the power source system comprising:
    a first power storage device;
    a voltage conversion device configured to convert a voltage from the first power storage device;
    a second power storage device configured to be electrically connected to a path linking the voltage conversion device and the rotary electric machine and supply electric power to the rotary electric machine;
    a first switch configured to switch between supply and shutoff of electric power between the first power storage device and the voltage conversion device;
    a second switch configured to switch between supply and shutoff of electric power from the second power storage device to the rotary electric machine; and an electronic control unit configured to close the first switch with activation of the power source system and close the second switch in response to a voltage applied to the rotary electric machine being increased to a predetermined voltage, the electronic control unit configured to prevent a start of the engine until the second switch is closed.

8. A control method of a power source system for supplying electric power to a load, the power source system including a first power storage device, a voltage conversion device, a second power storage device, a first switch, and a second switch, the control method, being executed by an electronic control unit, comprising:

closing, by the electronic control unit, the first switch, being configured to switch between supply and shutoff of electric power between the first power storage device and the voltage conversion device that is configured to convert a voltage from the first power storage device, to start supply of electric power with activation of the power source system;

increasing a voltage given from the first power storage device by using the voltage conversion device;

preventing, by the electronic control unit, a start of an engine until closing the second switch, said second switch being configured to switch between supply and shutoff of electric power from the second power storage device to the load, said second power storage device being electrically connected to a path that links the voltage conversion device and the load and the second power storage device being configured to supply electric power to the load, said load being a rotary electric machine coupled to the engine; and closing, by the electronic control unit, the second switch in response to a voltage applied to the load being increased to a predetermined voltage.

* * * * *